United States Patent

[11] 3,616,060

[72] Inventors John F. Askam
Sutton Coldfield;
Charles Goodwin, Alrewas, both of
England
[21] Appl. No. 778,943
[22] Filed Nov. 26, 1968
[45] Patented Oct. 26, 1971
[73] Assignee The Dunlop Company Limited
London, England
[32] Priority Dec. 1, 1967
[33] Great Britain
[31] 54,827/67

[54] PLY TURNING APPARATUS
15 Claims, 5 Drawing Figs.
[52] U.S. Cl. ................................................ 156/402
[51] Int. Cl. .............................................. B29h 17/22
[50] Field of Search........................................ 156/132,
394, 398, 400, 402, 410, 413, 421

[56] References Cited
UNITED STATES PATENTS
1,760,929 6/1930 Wikle............................ 156/402
2,649,892 8/1953 Appleby........................ 156/402

Primary Examiner—Benjamin A. Borchelt
Assistant Examiner—Stephen C. Bentley
Attorney—Ward, McElhannon, Brooks & Fitzpatrick ABSTRACT: Apparatus for turning-up and consolidating the free ends of a carcass ply around bead portions of tire carcass being built on a building drum comprising two assemblies each disposed equal distances from the midcircumferential plain of the drum on opposite sides thereof and movable simultaneously axially of the drum. Each assembly comprises a first freely rotatable disc tool and two freely rotatable frustoconical rollers mounted one on each side of the tool and inclined towards it, the rollers supporting and manipulating the free ends during the turning-up and consolidating operation by the tool to substantially prevent distortion and ruckling of the ply. A second tool may also be provided on each assembly for consolidating an element such as a breaker cushion or fitter strip located between the bead portions of the tire carcass being built.

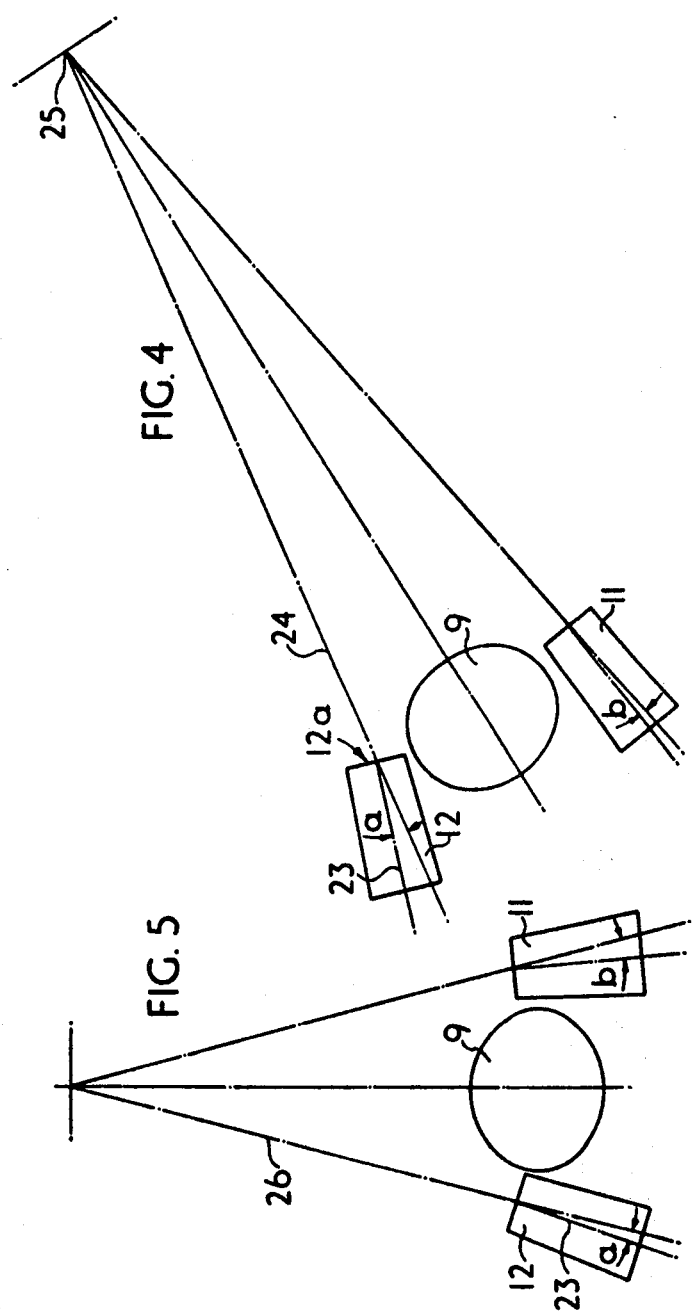

PLY TURNING APPARATUS

This invention relates to the manufacture of pneumatic tires.

In the manufacture of pneumatic tires a building drum is utilized upon which rubberized fabric plies are wrapped and it is well known that bead portions are enclosed at the edges of the plies by the turning-up of plies around them; this operation can cause considerable difficulty particularly when the plies incorporate steel wire cords.

It is an object of the present invention to provide an improved apparatus to enable this operation more effectively to be carried out.

According to the invention there is provided apparatus for turning-up and consolidating a ply of a tire carcass comprising a tire building drum for supporting said ply and a bead portion of the carcass beyond which a free end of a ply wrapped around the drum may extend and an assembly comprising two freely rotatable rollers and a first freely rotatable disc-shaped tool for engagement with the ply to press it directly against the bead portion, means being provided for traversing the first disc-shaped tool in contact with the ply around the bead portion during rotation of the drum to effect turnup of the ply, the said rollers being mounted one to each side of the first disc-shaped tool to engage the free end of the ply clear of the drum and to support and manipulate it during the turning-up and consolidating operation.

Preferably the rollers are of elongated, approximately cylindrical form, for example, frustoconical shaped, rounded or not at the smaller diametered end thereof. Preferably, also, the axes of rotation of the rollers are inclined towards one another with respect to an intermediate axis so that the axes are closest together at the smaller diametered ends of the rollers.

The apparatus may also turn up and consolidate other plies or layers of rubberized fabric provided in a tire in addition or alternatively to a carcass ply. In one example of an operation carried out by the apparatus, a chafer or filler strip is applied to the drum prior to the carcass ply which is located radially outwardly of the strip, the two layers consolidated together and then both turned up and consolidated around the bead portion.

One embodiment of the invention will now be described by way of example with reference to the accompanying drawings of which:

FIG. 4 shows, in diagrammatic form a view taken in direction of arrow X 3, FIG. 3 and FIG. 5 shows, in diagrammatic form a view taken along the axis of rotation of the drum when the rollers are nearly vertical.

Figure 1:
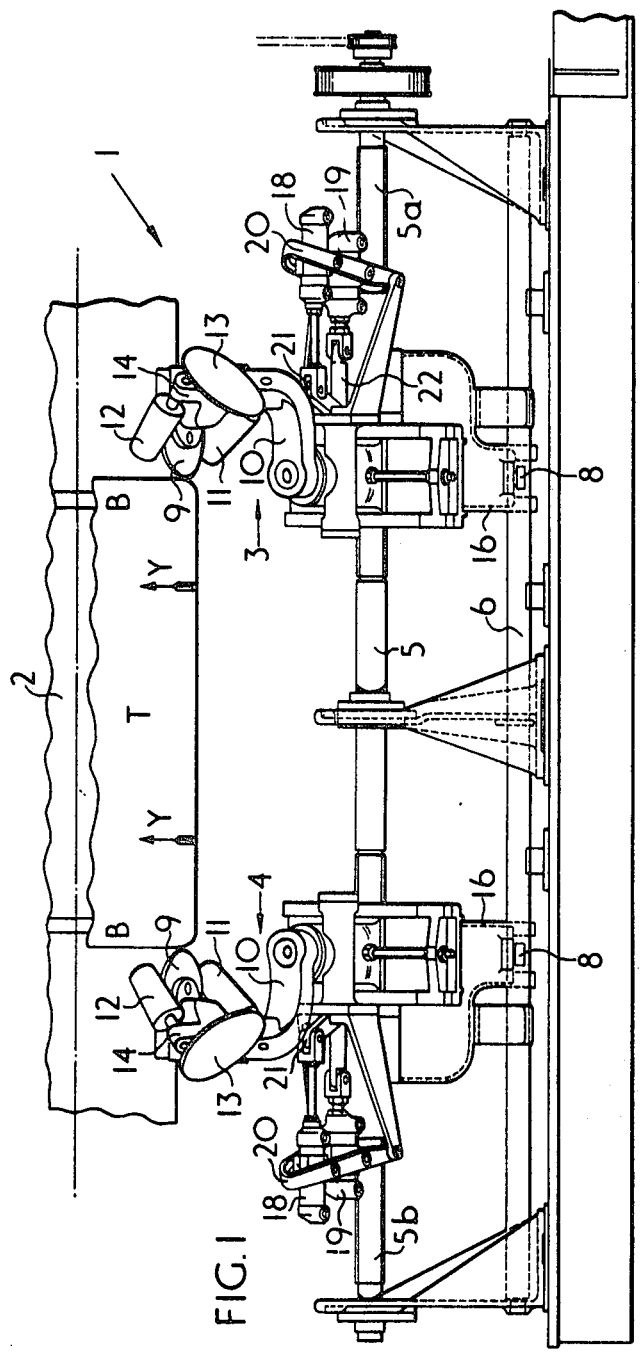
FIG. 1 shows a front view of the apparatus according to the invention, when the bead-spinning operation is just about to commence.

Throughout these drawings arrows "Y" indicate the direction of rotation of the drum during turnup. In copending U.S. Pat. application, Ser. No. 711,727, which is assigned to assignee of the present application, a tire building machine comprising a rotatable tire building drum, a first freely rotatable spinning disc for engagement with a bead portion of a tire mounted on the drum, a freely rotatable pivotal mounting for said disc to allow said disc to be rotated in an arc around the bead portion, first means for disposing the rotational axis of the pivotal mounting relative to said drum and thus to a bead portion thereon at a position where engagement of the said disc with the bead portion opposes rotation of the said disc in said arc around said pivotal mounting and causes the plane of rotation of said disc to assume different angular dispositions with respect to the bead portion, and second means for urging said disc against said bead portion and for rotatably urging said disc in an arc around said bead portion whereby the plane of rotation of said disc assumes successively different predetermined angular dispositions relative to the bead portion.

The apparatus of the present invention for building an 18.00×25 size earthmover tire carcass incorporates many of the features disclosed in the aforementioned application and is referred to generally in the drawings by the numeral 1.

It comprises a cylindrical, rotatable tire building drum 2 and two bead turnup and spinning assemblies 3 and 4, one for each bead portion B of a tire carcass T to be built on the drum 2. Each assembly is located generally underneath the drum on two parallel shafts 5 and 6, disposed parallel to and spaced apart from the horizontal axis and surface of the drum 2. The upper shaft 5 is screw-threaded in opposite senses at each of its ends 5a and 5b, and the assemblies are located thereon by two screw-threaded collars 7 forming part of the assemblies at equal distances from the midcircumferential plane of the drum. Rotation of this shaft 5 in one direction causes simultaneous movement of each assembly either towards or away from the said midcircumferential plane in a direction axially of the drum, while reverse rotation causes opposite movement of the assemblies. While this movement occurs the assemblies slide upon the lower shaft 6, two freely rotatable rollers 8 forming part of each assembly being disposed on opposite sides of the shaft 6 to facilitate the sliding motion.

Since the two assemblies 3 and 4 are similar one being a mirror image of the other in the midcircumferential plane of the drum only one will be described.

Each assembly comprises a first freely rotatable bead-spinning disc-shaped tool 9 disposed on a pivotally mounted cranked arm 10 and engageable with the ply (not shown) ) mounted on the drum to press it against the core C of a bead portion B. Also disposed on the arm one to each side of the disc 9 are two frustoconically shaped freely rotatable rollers 11 and 12 the angle of frustum of cone being about 4° to the axis thereof and the smaller-diametered ends of the roller being smoothly rounded. The first bead-spinning disc and the two rollers are mounted, together with a second freely rotatable spinning disc 13 of larger diameter than the bead spinning disc 9 on the head portion 14 of the pivotally mounted cranked arm 10 of the end thereof further from the threaded shaft 5. This second disc is for consolidating such tire elements as sidewall fillers and breaker cushions which form part of the carcass. It is mounted on one side of the head portion and has a planar face which abuts the similar face on similar disc on the assembly when the two assemblies are located adjacent the midcircumferential plane of the drum. The relative disposition of both discs and the rollers is such that when viewed along the axis of the pivotal mounting of the arm 10 i.e., as shown in FIG. 3 (in which this axis is referred to as 'A') the pane containing both roller axes is inclined at about 30° to the plane of the bead spinning disc, while the axis of the second filler or cushion- spinning disc 13 is inclined at about 45° to the plane of the bead spinning disc 9.

Figure 2:
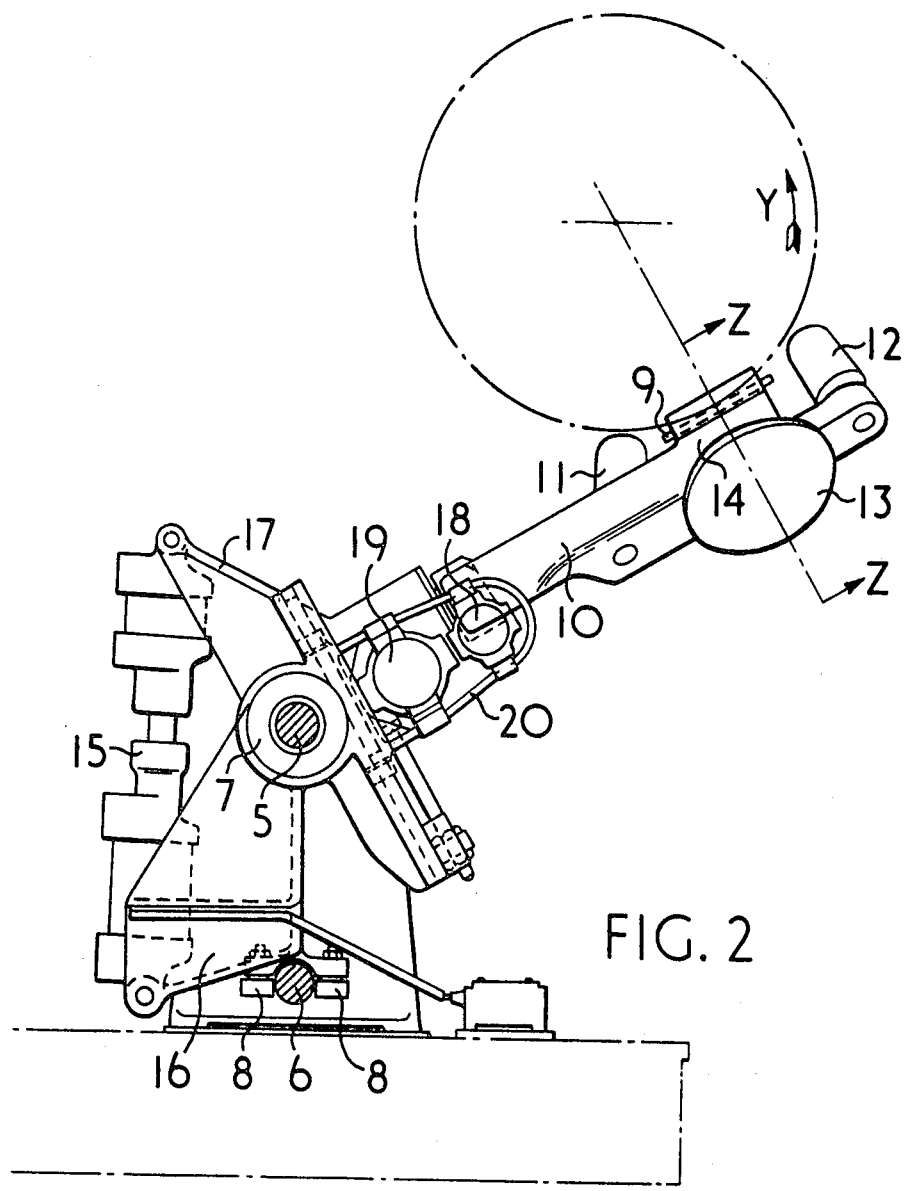
FIG. 2 shows a side view of the apparatus shown in FIG. 1.

The assembly is rotatable about the threaded shaft 5 substantially within a radial plane of the drum to bring the bead-spinning disc into or out of operative association with the shoulder of the drum i.e., with the bead portion B of a tire carcass to be built thereon, by actuation of a two-stage pneumatic piston and cylinder assembly 15 pivotally connected between the lower part 16 of the assembly adjacent the lower shaft 6 and an arm portion 17 of the assembly extending approximately at right angles to the cranked arm 10 when viewed from the side of the apparatus 1 in a direction parallel to the axis of rotation of the drum i.e., as shown in FIG. 2.

The bead spinning disc 9 and associated rollers 11 and 12 are arcuately traversable of the bead portion B of the carcass being built on the drum by rotating the shaft 5 to cause the assembly to move axially of the drum and simultaneously causing the cranked arm 10 to rotate about the axis A perpendicular to the axis of the drum 2. This rotation is effected during rotation of the drum by actuation of a double-acting pneumatic piston and cylinder assembly 19 mounted on that side of the assembly 2 or 3 further from the midcircumferential plane of the drum to cause the turning-up of the ply around the bead portion. A second piston and cylinder assembly 18 is arranged parallel to the assembly 19 on that side thereof further from the shaft 5 for a purpose to be described later both assemblies being arranged in a yoke 20 and pivotally mounted on levers 21 and 22 disposed in an offset position relative to the axis of rotation of the cranked arm. Thus not only does the assembly 19 cause the disc to traverse around the bead portion, but it also applies pressure in an axial direction for consolidation as will later be described.

Figure 3:
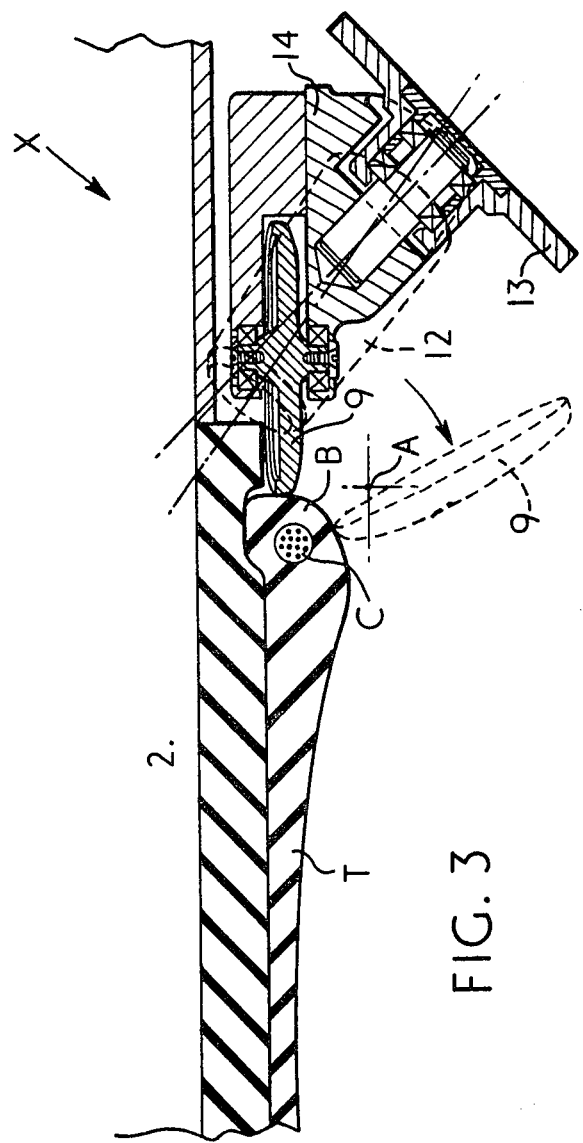
FIG. 3 shows a part sectional part scrap view of the right-hand assembly of FIG. 1.

The disposition of the bead spinning disc is such that when viewed in its position at the commencement of the turnup operation i.e., in a direction at right angles to its axis of rotation and in a direction looking towards the drum when the disc is disposed with its axis at right angles to a plane containing the axis of rotation of the drum (as shown in FIG. 3), a circumferential plane of the disc is not tangential to a circumference of the drum but inclined at between 2° and 5° in a trailing sense, to a trangential line, this serving to provide a good standard of turnup and to maintain the disc in intimate contact with the ply.

The disposition of the axis of rotation of the cranked arm relative to the shoulder of the drum and thus to the bead portion B of a tire carcass on the drum in such that while the drum and disc are rotating, the movement of the disc 9 by the piston and cylinder assembly 19 limits the degree of arc rotation around the axis, the angular disposition of the disc 9 with respect to the bead portion B thereby being set and controlled in a similar manner to the equivalent disc of the invention described in the above-mentioned U.S. Pat. application Ser. No. 711,727. This relative disposition also causes the bead-spinning disc to start the turnup and consolidating operation as shown in FIG. 3 with the plane of the disc substantially normal to the surface of the bead portion but during a substantial part of the arcuate movement, it moves into a leading angular disposition (shown in dotted form in FIG. 3) it having been found that such a disposition of a few degrees improves the consolidating action. However at the end of the arcuate traverse the disc no longer has this leading disposition but its plane is normal to the bead portion and apart from the 2° to 5°inclination referred to before, it located in a radial plane of the drum.

As shown in FIG. 4 and 5 the frustoconical rollers 11 and 12 are generally inclined towards the bead-spinning disc 9 located between them so that the axes of the roller are closest at the smaller diametered ends thereof. The leading roller 12 i.e., that roller being the first to contact a given portion of the free end of the ply during rotation of the drum is inclined with its axis 23 at 10° to a line 24 joining the center of the smaller diametered end face 12a of the roller to the center 25 of the drum i.e., that point where the axis of rotation of the drum passes through the midcircumferential plane thereof, when viewed in the direction of arrow X in FIG. 3, whilst the trailing roller 11 is inclined at 3° in an opposite sense to the leading roller. However the construction of the apparatus is such that when the bead-spinning disc and rollers have traversed around the bead portion to a position such that a plane containing the longitudinal edge of each frustoconical roller nearest the midcircumferential plane of the drum is substantially in a radial plane of the drum, in this position the axis of the leading roller is inclined at 5° to a radius 26 of the drum passing through the center of the smaller diametered end face of the roller, whilst the axis of the trailing roller is inclined at 10°. In both FIGS. 4 and 5 the inclination of the leading roller 12 is shown as "a" while that of the trailing rollers 11 is shown as "b." It should also be noted that the lines 24 and 25 in FIGS. 4 and 5 are not the same.

The reason for these various inclinations and the rounded frustoconical shape of the rollers is so that for the size of tire being built upon the apparatus, in this case 18.00×25 when the peripheral surface of the rollers engages the free end of the ply overhanging the bead portion B, the peripheral speed of the ply end and that of the roller is substantially equal along the whole length of contact between ply end and roller so as to avoid distortion of the ply fabric which might otherwise occur during the turnup operation. However, for other size tires other inclinations and shapes may be preferable to avoid the said distortion.

The operation of the apparatus just outlined will now be described.

Each spinning assembly is moved substantially tadially of the drum by actuation of the piston and cylinder assembly 15 from a disengaged position beneath it into a position in the cylindrical space created by the overhanging ends of the ply i.e., as shown in FIG. 1 to 3, and the bead-spinning disc 9 traversed in an arc around the bead portion B to turnup and consolidate the ply end. This is effected by simultaneously rotating the shaft 5 to cause the assembly to move axially inwardly of the drum and operating the piston and cylinder assembly 19 to apply a force in a direction axially outwardly of the drum. The disc, under the influence of the axially inward force of the shaft 5, the axially outward force of the bead portion, thus takes up the leading angular disposition referred to previously and traversed around the bead portion B. Approximately half way round its approximately 90° arc of traverse a limit switch is operated by the assembly which causes the piston and cylinder assembly 19 to reverse its direction of applied force so that this is now in direction axially inwardly of the drum. By so doing the disc decreases its leading angular inclination so that when the arm 10 on which it is mounted has moved approximately 90° the disc is in substantially a radial plane of the drum as described previously. During this operation the frustoconical shaped rollers have the following functions.

The rollers engage with the overhanging end of the ply and are freely rotated by it, their disposition with respect to the bead spinning disc being such that they maintain the ply end in a position clear of the spinning disc except at the point when the spinning disc is operating to turnup and consolidate the ply.

In Addition, they cause the ply end to "bell out" and remain taut so avoiding the creation of ruckles or waves in the ply during spinning. As the spinning operation progresses so the ply is gently and progressively stretched by the rollers to supplement the action of the bead-spinning disc resulting in an accurate and undistorted ply turning operation. When the ply has been consolidated around the bead portion and the bead-spinning disc 9 has been moved a short distance axially inwardly of the bead portion, it is disengaged from the carcass of the tire radially of the drum by actuation of the piston and cylinder assembly 15. Then by suitable actuation of the piston and cylinder assemblies 18 and 19 the cranked arm 10 is rotated to move the second filler or cushion-spinning disc 13 into a substantially radial plane of the drum. The shaft 5 is rotated to move the assemblies adjacent to the midcircumferential plane of the drum and the piston and cylinder assembly 15 is then reactuated to press this disc 13 against the carcass with the filler or cushion applied thereto. On rotation of the shaft 5 the two assemblies 3 and 4 move away from each other simultaneously commencing from the midcircumferential plane of the drum. The whole carcass is thus consolidated across the whole axial width of the drum by means of the two disc tools 9 and 13. The second disc 13 is provided and used for this last operation rather than the bead-spinning disc 9 because the rollers 11 and 12 and the cranked arm 10 prevents consolidation all the way from the midcircumferential plane of the drum.

Having now described our invention what we claim is:

1. Apparatus for turning-up and consolidating a ply of a tire carcass comprising a tire building drum for supporting said ply and a bead portion of the carcass beyond which a free end of the ply wrapped around the drum may extend, an assembly comprising a first freely rotatable disc-shaped tool and two freely rotatable rollers mounted one on each side of said disc-shaped tool, a mounting for said assembly to allow said assembly to traverse arcuately around the bead portion during rotation of the drum, said disc-shaped tool being mounted in said assembly to engage that part of the ply adjacent the bead portion and press it directly against the bead portion as said assembly is arcuately traversed around the bead portion, said two rollers being mounted in said assembly adjacent said disc-shaped tool to engage the free end of the ply clear of the drum to support and manipulate it as said assembly is traversed around the bead portion, and means for traversing said assembly about said bead portion thereby turning-up and consolidating said ply.

2. Apparatus according to claim 1 wherein the rollers are of frustoconical shape.

3. Apparatus according to claim 2 wherein the rollers are of rounded form at the smaller diametered end thereof.

4. Apparatus according to claim 2 wherein the axes of rotation of the rollers are inclined towards one another, the axes being closer at the smaller diametered ends of the rollers.

5. Apparatus according to claim 1 wherein the shape and disposition of the rollers relative to one another and to the drum causes the peripheral speed of the ply end engaged by the rollers to be substantially equal along the whole length of contact between the ply end and the rollers during the turning-up and consolidation operation whereby distortion of the ply is substantially avoided.

6. Apparatus according to claim 1 comprising means for moving the first disc-shaped tool and rollers towards the bead portion of the carcass and for pressing that part of the ply in engagement with the tool against the bead portion.

7. Apparatus according to claim 1 wherein the means provided for traversing the assembly around the bead portion rotatably urges the first tool and rollers in an arc around the pivotal mounting to incline the first tool into predetermined angular disposition relative to the bead portion, the disposition of the rotational axis of the pivotal mounting with respect to the drum and thus to a bead portion thereon being such that engagement of the first tool with the ply pressed against the bead portion limits the degree of arc rotation of the first tool around the pivotal mounting and thus defines the angular disposition of the plane of rotation of the first tool with respect to the bead portion.

8. Apparatus according to claim 1 wherein the disposition and movement of the assembly causes the first tool to assume during a substantial part of its arcuate movement round the bead portion, a leading angular disposition relative to the bead portion.

9. Apparatus according to claim 1 wherein the first tool is mounted on the assembly such that when viewed in a direction at right angles to its axis of rotation and in a direction looking towards the drum when the first tool is disposed with its axis at right angles to a plane containing the axis of rotation of the drum a circumferential plane of the first tool is inclined in a trailing sense at an angle of between 2° and 5° to a trangent to the circumference of the bead portion to the point of contact between the first tool and the bead portion.

10. Apparatus according to claim 1 comprising a screw-threaded shaft arranged parallel to and spaced away from the drum axis upon which the assembly is disposed, rotation of the shaft causing the assembly and therefore the first tool and rollers to move axially of the drum.

11. Apparatus according to claim 10 comprising a pneumatic piston and cylinder assembly for urging the first tool and rollers in an arc around the bead portion.

12. Apparatus according to claim 1 wherein simultaneous rotation of the shaft and actuation of the piston and cylinder assembly causes the first tool to move in an arc around the bead portion to consolidate that part of the ply engaged by the tool thereof.

13. Apparatus according to claim 1 wherein a pneumatic piston and cylinder assembly is provided for moving the first tool in a substantially radial plane of the drum into engagement with the ply mounted thereon.

14. Apparatus according to claim 1 wherein a second freely rotatable disc-shaped tool is provided on the assembly for consolidating a tire element between the bead core and the midcircumferential plane of the drum.

15. Apparatus according to claim 1 comprising the said drum, two assemblies each comprising two freely rotatable rollers, a first freely rotatable disc-shaped tool for engagement with the ply and a second freely rotatable disc-shaped tool for engagement with the carcass between the bead portions and means for moving the two assemblies simultaneously axially of the drum in opposite directions, the distances between the midcircumferential plane of the drum and the two assemblies remaining substantially equal.

* * * * *